(12) United States Patent
Kwon et al.

(10) Patent No.: US 12,674,730 B2
(45) Date of Patent: Jul. 7, 2026

(54) METHODS FOR SELECTIVELY SEPARATING SAMPLES FROM SUBSTRATE

(71) Applicant: Seoul National University R&DB Foundation, Seoul (KR)

(72) Inventors: Sunghoon Kwon, Seoul (KR); Sungsik Kim, Seoul (KR); Yushin Jung, Seoul (KR); Amos Chungwon Lee, Seoul (KR); Sangwook Bae, Suwon-si (KR); Jinhyun Kim, Seoul (KR)

(73) Assignee: METEOR BIOTECH, CO. LTD., Seoul (KR)

( * ) Notice: Subject to any disclaimer, the term of this patent is extended or adjusted under 35 U.S.C. 154(b) by 1857 days.

(21) Appl. No.: 15/770,765

(22) PCT Filed: Oct. 27, 2016

(86) PCT No.: PCT/KR2016/012179
§ 371 (c)(1),
(2) Date: Apr. 25, 2018

(87) PCT Pub. No.: WO2017/074067
PCT Pub. Date: May 4, 2017

(65) Prior Publication Data
US 2019/0056294 A1 Feb. 21, 2019

(30) Foreign Application Priority Data
Oct. 27, 2015 (KR) ........................ 10-2015-0149100

(51) Int. Cl.
*G01N 1/28* (2006.01)
(52) U.S. Cl.
CPC ..... *G01N 1/286* (2013.01); *G01N 2001/2873* (2013.01); *G01N 2001/2886* (2013.01)

(58) Field of Classification Search
CPC ........... G01N 1/286; G01N 2001/2873; G01N 2001/2886
See application file for complete search history.

(56) References Cited

U.S. PATENT DOCUMENTS

| | | | |
|---|---|---|---|
| 6,897,038 B2 | 5/2005 | Bonner et al. | |
| 7,968,819 B2 * | 6/2011 | Okada .................. | B23K 26/032 219/121.68 |

(Continued)

FOREIGN PATENT DOCUMENTS

| | | |
|---|---|---|
| JP | 19990148887 A | 6/1999 |
| JP | 2002156316 A | 5/2002 |

(Continued)

OTHER PUBLICATIONS

Simone et al. "Technical Advance—Sensitive Immunoassay of Tissue Cell Proteins Procured by Laser Capture Microdissection", American Journal of Pathology, vol. 156, No. 2, Feb. 2000. (Year: 2000).*

(Continued)

*Primary Examiner* — Rodney G McDonald
(74) *Attorney, Agent, or Firm* — STIP Law Group, LLC

(57) ABSTRACT

Provided is a method for selectively separating samples from a substrate. The method includes: providing a substrate mounted with samples; selecting one or more desired target areas from areas of a layer of the samples; patterning an energy source so as to correspond to the target areas; and extracting energy from the patterned energy source, applying the extracted energy to the target areas such that target samples corresponding to the target areas are released from the substrate, and recovering the target samples.

3 Claims, 10 Drawing Sheets

(56)                References Cited

U.S. PATENT DOCUMENTS

| | | | |
|---|---|---|---|
| 8,715,955 | B2 | 5/2014 | Donovan et al. |
| 8,722,357 | B2 | 5/2014 | Baer et al. |
| 2001/0050083 | A1* | 12/2001 | Marchitto ........ A61B 5/150351 |
| | | | 128/898 |
| 2010/0020299 | A1* | 1/2010 | Zebala ................ G03F 7/70291 |
| | | | 355/67 |

FOREIGN PATENT DOCUMENTS

| | | |
|---|---|---|
| JP | 2003161893 A | 6/2003 |
| JP | 2004170930 A | 6/2004 |
| KR | 1020130151869 A | 6/2014 |

OTHER PUBLICATIONS

International Search Report of PCT/KR2016/012179, Jan. 6, 2017, English translation.

Thomas Einhorn; The Cell and Molecular Biology of Fracture Healing; Clinical Orthopaedics and Related Research; 355S, pp. S7-S21; 1998 Lippincott Williams & Wilkins; Philadelphia PA (USA).

L. Schermelleh et al.; Laser Microdissection and Laser Pressure Catapulting for the Generation of Chromosome-Specific Paint Probes; BioTechniques; vol. 27, No. 2 (1999); pp. 362-367; Informa BioSciences (United States).

* cited by examiner

[Fig. 1]
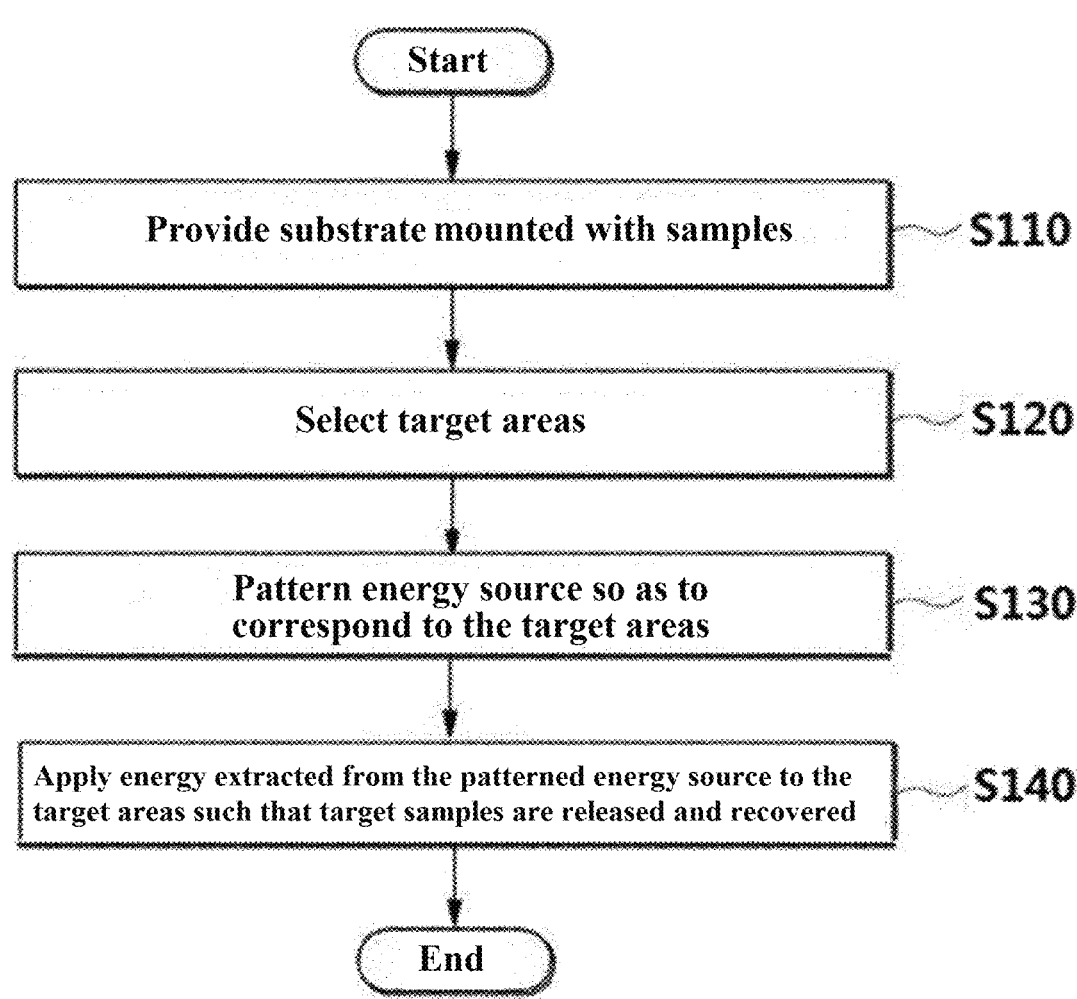

[Fig. 2]
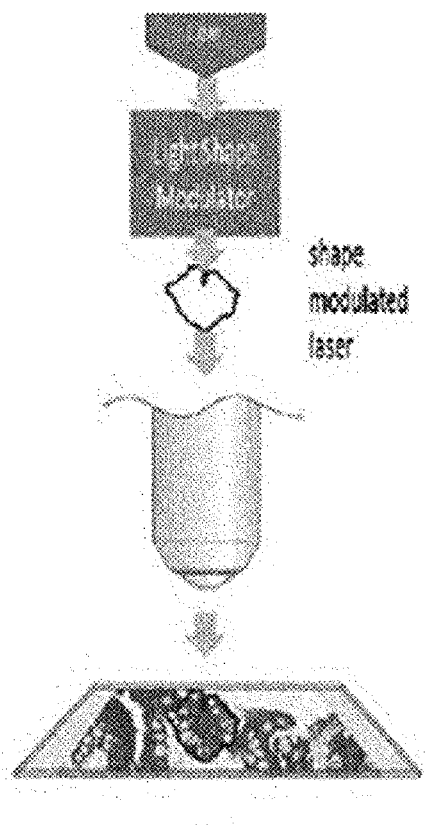
shape
modulated
laser
(A)
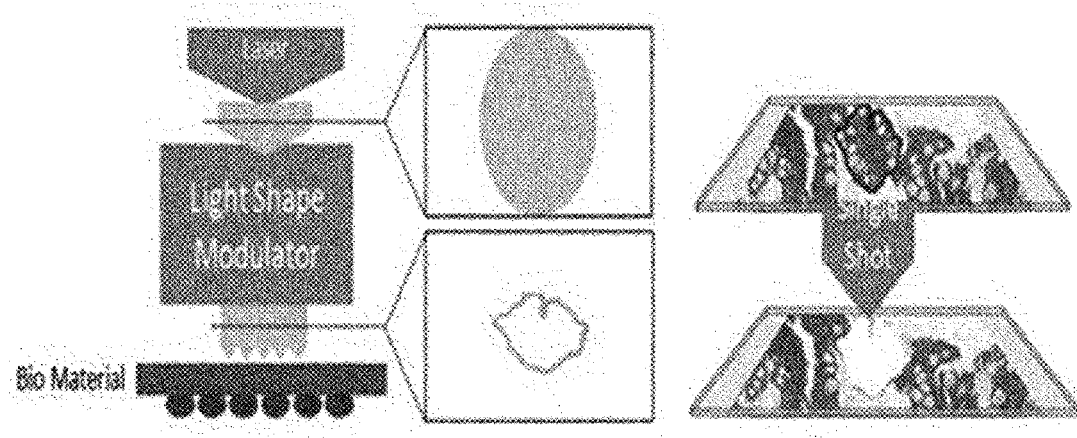
(B)

[Fig. 3]
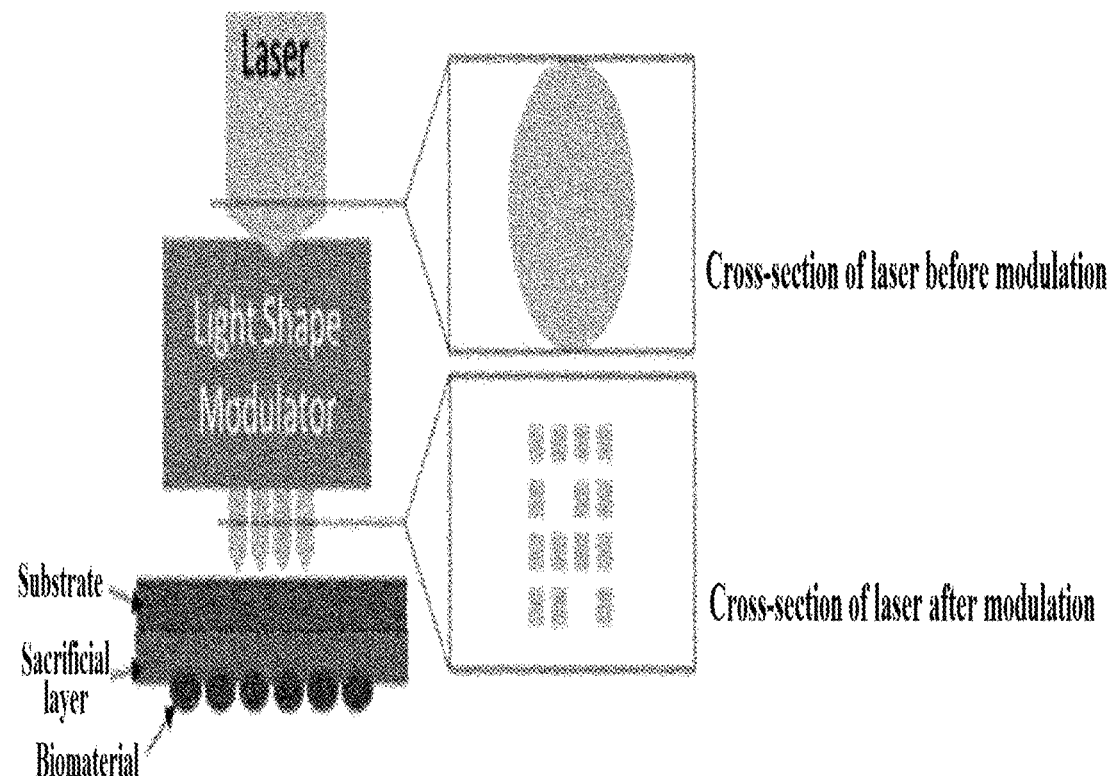

[Fig. 4]
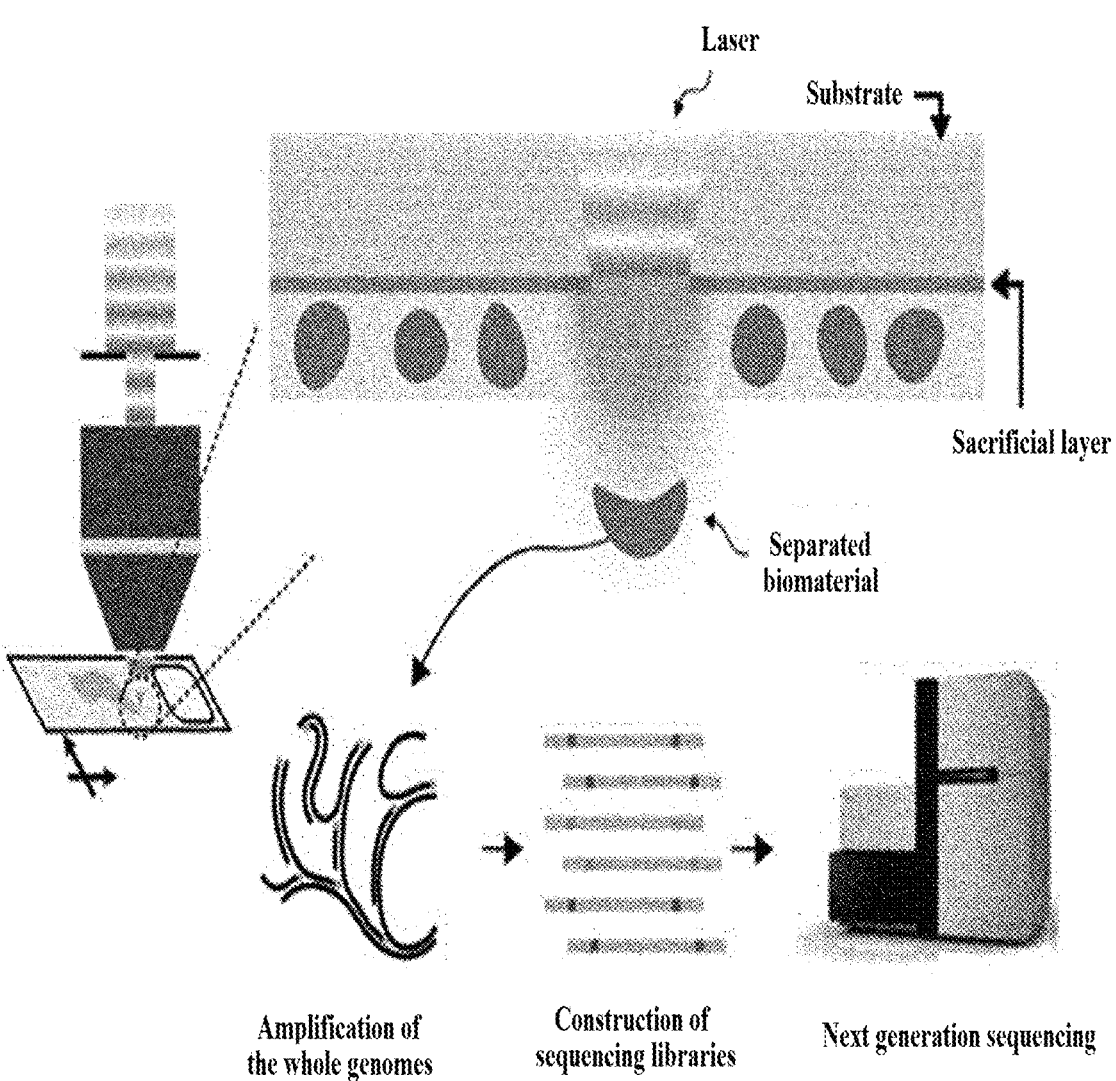
Amplification of
the whole genomes
Construction of
sequencing libraries
Next generation sequencing

[Fig. 5]
A
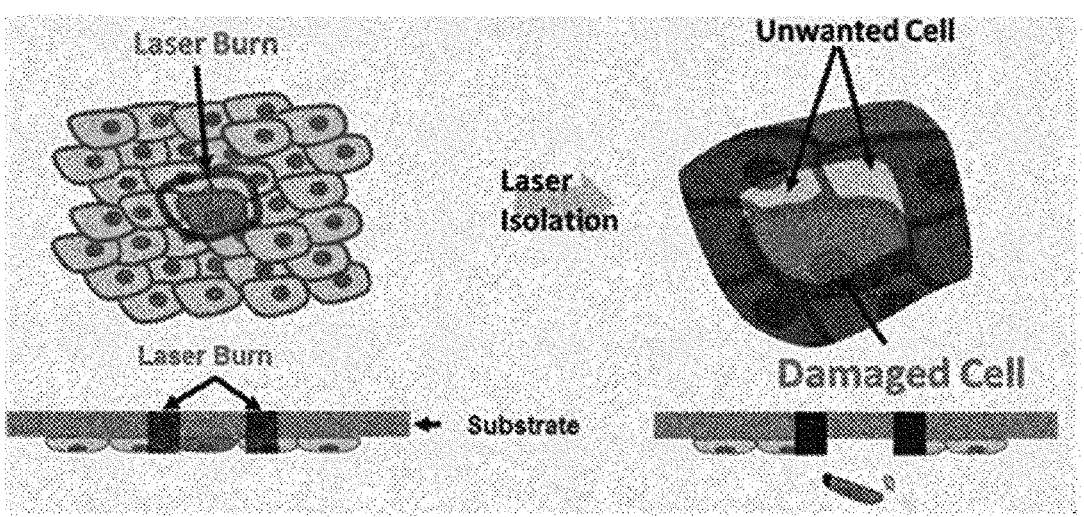
B
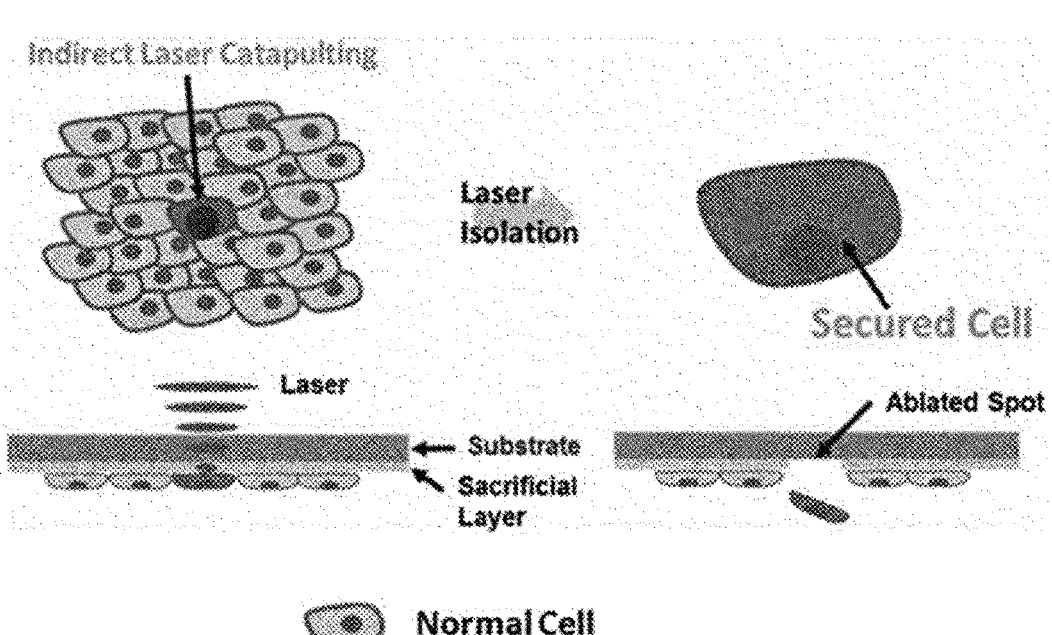

[Fig. 6]
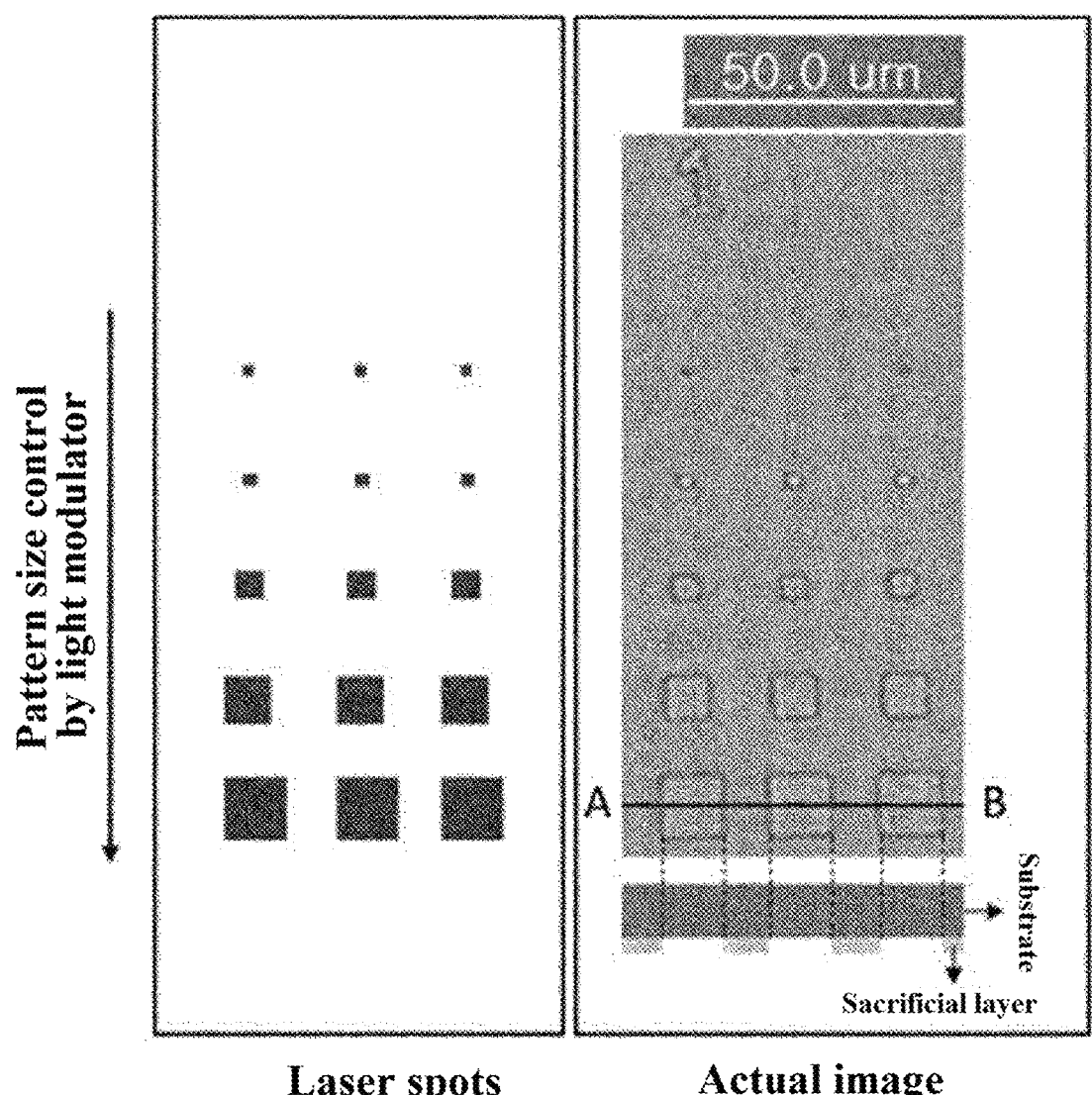
Laser spots          Actual image

[Fig. 7]

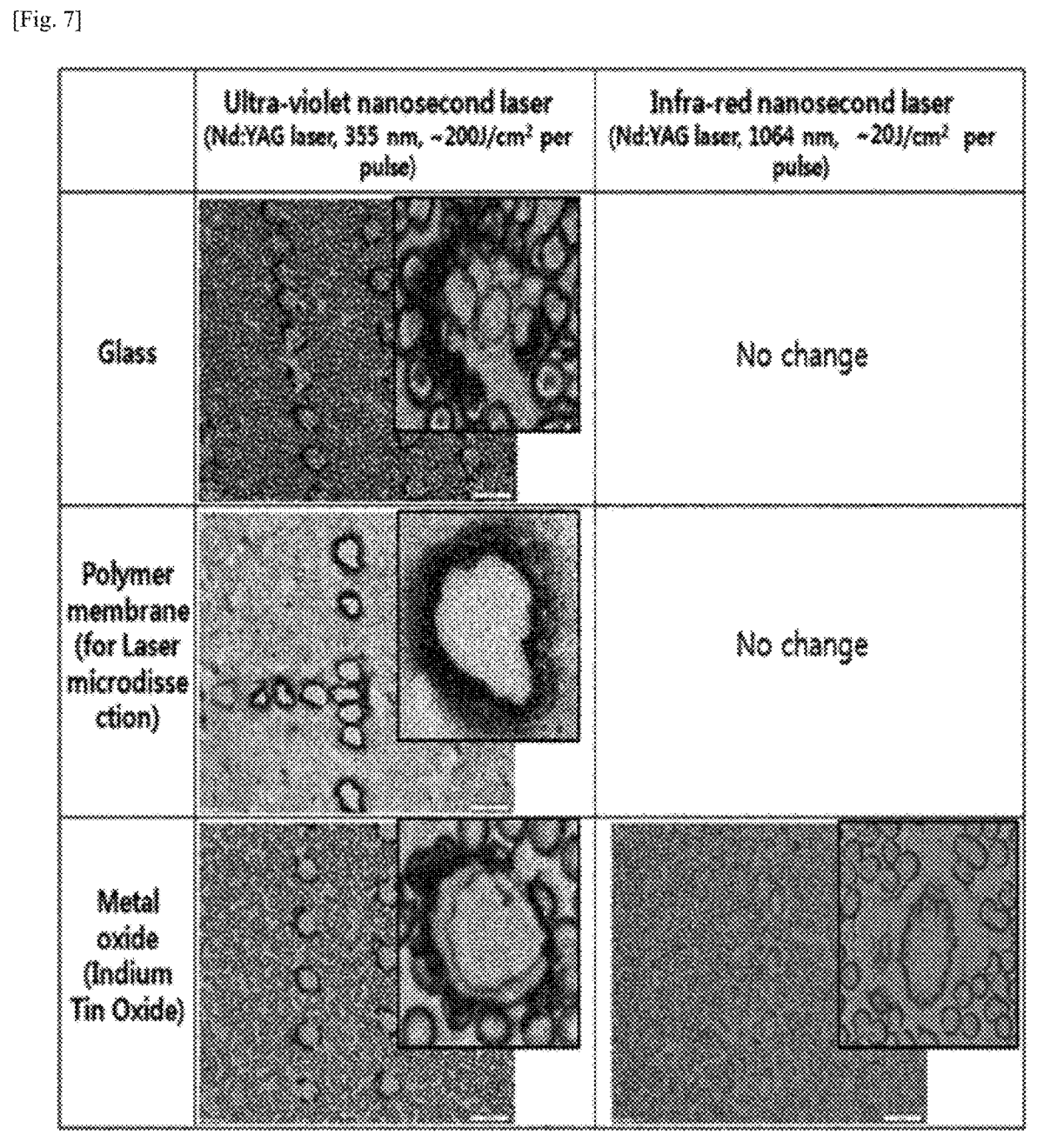

| | Ultra-violet nanosecond laser (Nd:YAG laser, 355 nm, ~200J/cm² per pulse) | Infra-red nanosecond laser (Nd:YAG laser, 1064 nm, ~20J/cm² per pulse) |
|---|---|---|
| Glass | | No change |
| Polymer membrane (for Laser microdissection) | | No change |
| Metal oxide (Indium Tin Oxide) | | |

[Fig. 8]
A
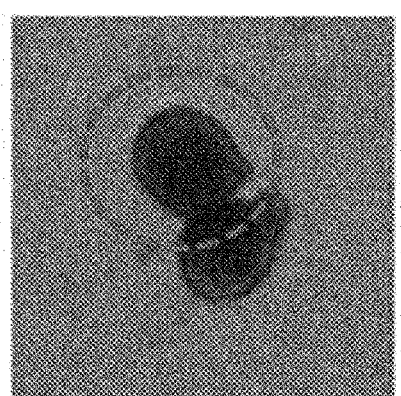 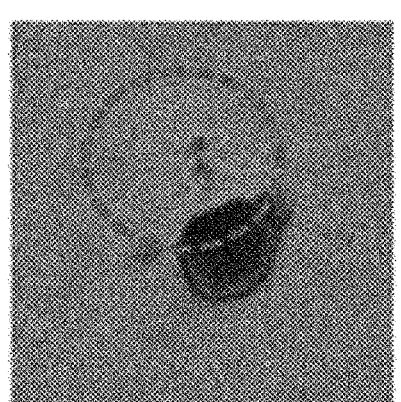
*Blood smear*
B
 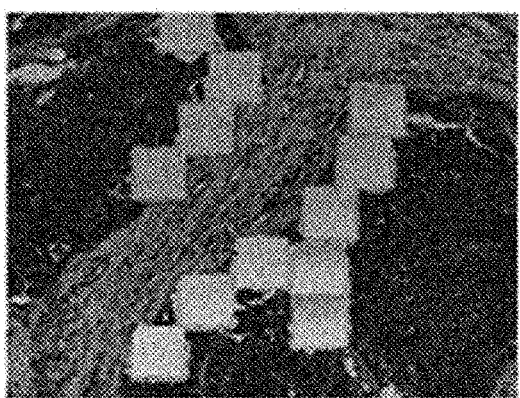
*Tissue section*

[Fig. 9]
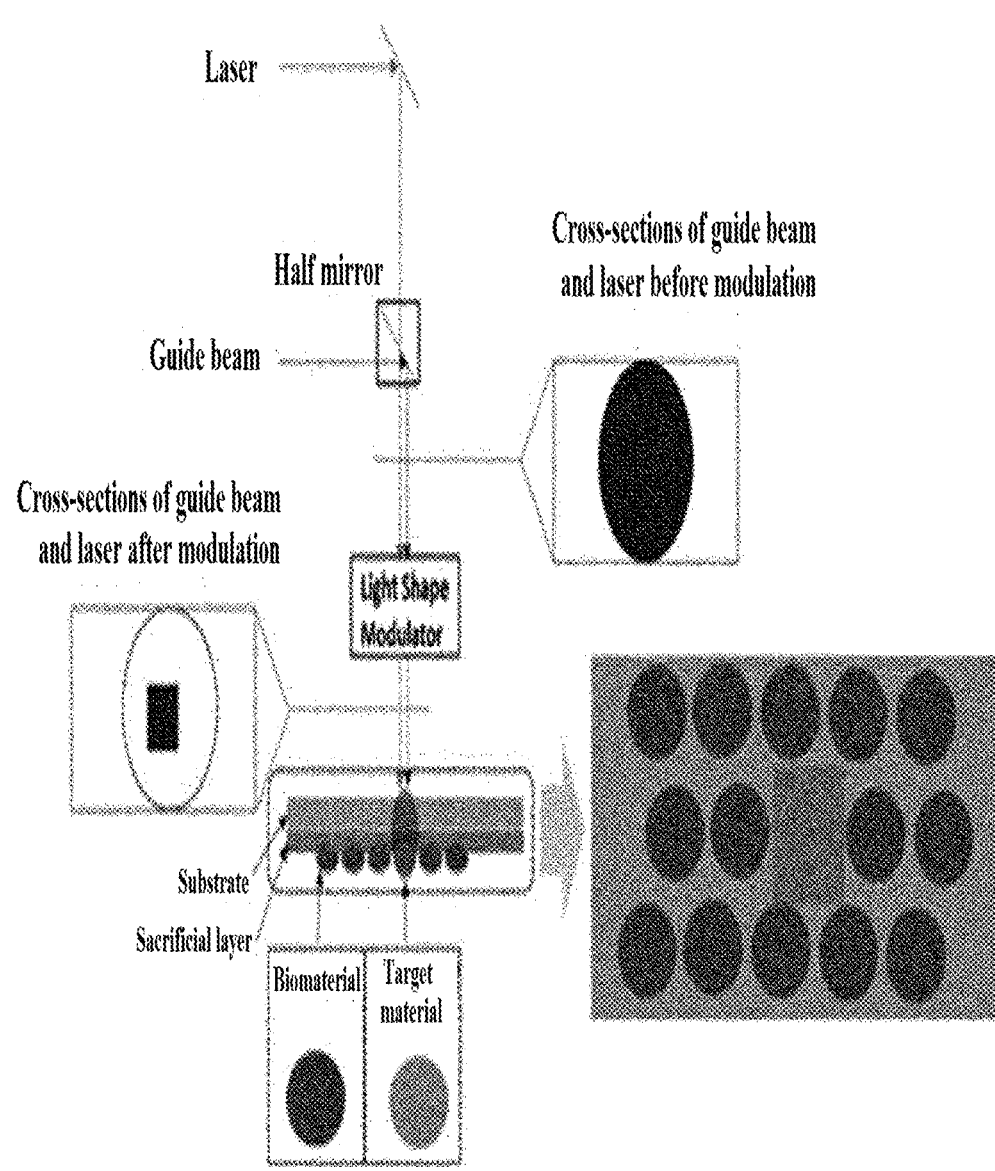

[Fig. 10]
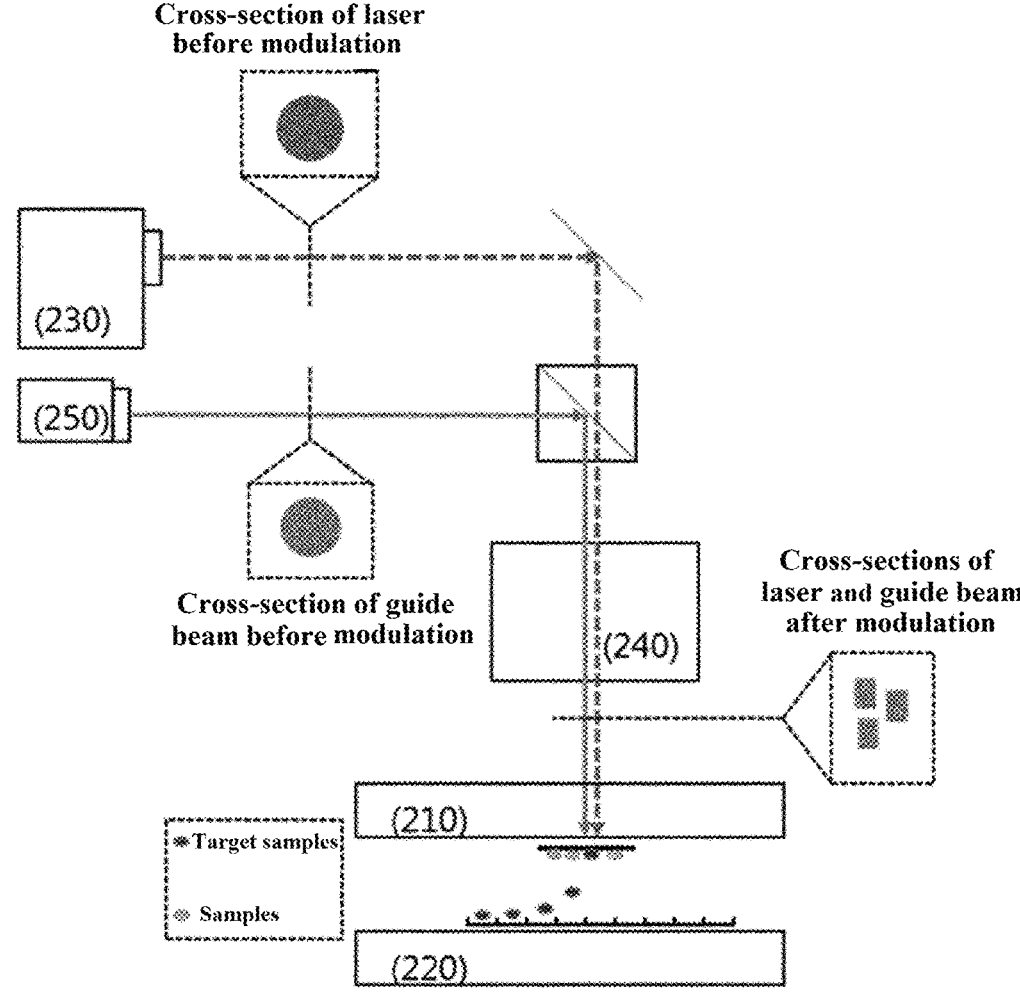

METHODS FOR SELECTIVELY SEPARATING SAMPLES FROM SUBSTRATE

CROSS-REFERENCE TO RELATED APPLICATIONS

This application is the U.S. National Phase under 35 U.S.C. § 371 of International Application No. PCT/KR2016/012179 filed on Oct. 27, 2016, which in turn claims the benefit of Korean Application No. 10-2015-0149100, filed on Oct. 27, 2015, the disclosures of which are incorporated by reference into the present application.

TECHNICAL FIELD

The present disclosure relates to methods for selectively separating samples from a substrate.

BACKGROUND ART

Methods for selectively separating materials, including biological materials, in samples in high purity when the materials are necessary. In recent years, the widespread use of laser-based separation processes has enabled efficient separation of target materials on a micrometer scale even when the target materials are present in limited amounts or need to be discerned by visual observation. However, most of such processes are limited from a technical point of view. Particularly, specific cancer cells as analytes are difficult to selectively separate from slides of genetically heterogeneous cancer tissues.

Laser-based separation processes can be divided into micromanipulation with light, microstructure construction with light, laser capture microdissection, etc. Micromanipulation with light refers to a process in which microstructures are physically and chemically modified, for example, based on radiation pressure, thermal expansion, etching or optical tweezing effect of laser or pulsed laser. Microstructure construction with light refers to a process in which photoreactive materials are physically and chemically modified into microstructures. Laser capture microdissection refers to a process in which samples mounted on a substrate are separated by laser dissection or by dissection of the substrate with a laser and are then isolated.

These separation processes are carried out in such a manner that a laser is focused on spots to burn areas around target materials and cut out the target materials. However, the burning causes thermal damage to the samples, bringing about chemical deformation of the samples. Particularly, biological materials such as DNAs, RNAs, and proteins in biological samples may be damaged, impeding their accurate analysis in subsequent processes.

During laser microdissection, a laser is applied to a moving substrate mounted with samples. The path of the laser is precisely controlled to separate only selected sites without the need to move the material-mounted plate. However, since this path change is limited, the location of the substrate should also be controlled when the materials are large in size. In the case where a computer-controlled electrically-driven stage is not provided, the application of laser to areas around the target materials tends to generate errors. Even if an electrically-driven stage is used, the separation speed is limited depending on the speed of the electrically-driven stage. Further, movement of the sample-mounted substrate causes cumulative errors, resulting in separation and burning of unwanted areas. The use of an expensive electrically-driven stage with less cumulative error imposes an economical burden. Thus, there is a need for highly reliable, accurate, and speedy separation methods without damage to target samples.

REFERENCES

U.S. Pat. No. 8,722,357 (issued on May 13, 2014)
U.S. Pat. No. 8,715,955 (issued on May 6, 2014)
U.S. Pat. No. 7,968,819 (issued on Jun. 28, 2011)
BioTechniques, Vol. 2, No. 2 (1999)
Cellular and Molecular Biology, 44 (1998)

DETAILED DESCRIPTION OF THE INVENTION

Means for Solving the Problems

According to one aspect of the present disclosure, there is provided a method for selectively separating samples from a substrate, including: providing a substrate mounted with samples; selecting one or more desired target areas from areas of a layer of the samples; patterning an energy source so as to correspond to the target areas; and extracting energy from the patterned energy source, applying the extracted energy to the target areas such that target samples corresponding to the target areas are released from the substrate, and recovering the target samples.

According to a further aspect of the present disclosure, there is provided a method for selectively separating samples from a substrate, including: providing a substrate mounted with biological material samples; selecting one or more desired target areas from areas of a layer of the biological material samples; extracting light energy from a laser light source; modulating the shape of the extracted light so as to correspond to the shape of target samples corresponding to the target areas; applying a single shot of the light energy such that the shape-modulated light matches the target areas, to allow the target samples to be released from the substrate; and recovering the released target samples on a counterpart substrate.

According to another aspect of the present disclosure, there is provided an apparatus for selectively separating samples from a substrate, including: a stage adapted to support a substrate mounted with samples; a laser light source unit from which light is extracted to separate target samples from the samples; a light shape modulator adapted to pattern the laser light along the shape of target areas where the target samples are located; and a sample recovery stage on which a substrate is located to accommodate the separated target samples.

BRIEF DESCRIPTION OF THE DRAWINGS

FIG. 1 is a flow chart illustrating one embodiment of a method for selectively separating samples from a substrate.

FIG. 2 is a process flow diagram illustrating a method for separating biological materials according to one embodiment of the present disclosure.

FIG. 3 is a schematic diagram illustrating a method for separating biological materials according to a further embodiment of the present disclosure.

FIG. 4 is a schematic diagram for more specifically explaining the role of a sacrificial layer in the embodiment of FIG. 3.

FIG. 5 compares a conventional laser microdissection process A with a laser-based separation method B according to one embodiment of the present disclosure.

FIG. 6 is an actual image showing the removal of a sacrificial layer when rectangular laser beam spots whose sizes were controlled using a light modulator were irradiated onto a substrate;

FIG. 7 shows the results of experiments for separating biological samples using different wavelengths of laser beams and different types of sacrificial layers;

FIG. 8 shows microscopy images of a blood smear specimen A and a tissue section specimen B before and after separation by laser irradiation.

FIG. 9 is a schematic diagram illustrating a method for separating biological materials according to another embodiment of the present disclosure.

FIG. 10 illustrates an apparatus for selectively separating samples from a substrate according to one embodiment of the present disclosure.

MODE FOR CARRYING OUT THE INVENTION

Embodiments of the present disclosure will now be described in detail with reference to the accompanying drawings. These embodiments are provided so that this disclosure will be thorough and complete, and will fully convey the scope of the disclosure to those skilled in the art. Accordingly, the present disclosure may be embodied in many different forms and should not be construed as limited to the exemplary embodiments set forth herein. In the drawings, the dimensions, such as widths, lengths and thicknesses, of elements may be exaggerated for clarity. The drawings are explained from an observer's point of view. It will be understood that when an element is referred to as being "on" another element, it can be directly on the other element, or one or more intervening elements may also be present therebetween.

FIG. 1 is a flow chart illustrating one embodiment of a method for selectively separating samples from a substrate.

Referring to FIG. 1, a substrate mounted with samples is provided (S110). The samples are not particularly limited and are generally biological materials. Problems encountered in the use of biological materials are described in the Background Art. The biological materials may be those that are naturally occurring or artificially synthesized. The biological materials are specifically selected from the group consisting of tissues, blood, cells, DNAs, RNAs, proteins, exosomes, metabolites, biopsy specimens, and mixtures thereof. Generally, the biological materials may be cells or tissues that have a size of several micrometers to several hundreds of micrometers.

The biological materials may be provided on the substrate by suitable techniques, such as stamping, rolling, smearing, capillary action, microfluidics, pipetting and dispensing.

Any substrate that provides a surface for supporting the biological materials may be used without particular limitation. The substrate may be selected from the group consisting of slide glass, microbeads, nanoparticles, nanostructures, capillaries, microfluidic supports, porous structures, spongy structures, dendrimers, and combinations thereof. The substrate may be one whose surface is partially or fully functionalized with one or more chemical functional groups or one or more biological samples such as DNAs, RNAs, and proteins. The substrate may be made of glass, silicon or a polymeric material. For example, the substrate may be slide glass or a microarray substrate integrated with biological samples such as DNAs and proteins.

Specifically, the substrate may be a laser-transmitting substrate. Laser light, including pulsed laser light, may be applied to the substrate.

The samples are mounted on the substrate, but some thereof may be mounted in the substrate, if needed.

In S120, one or more desired target areas are selected from areas of a layer of the samples. The samples may be immobilized onto the substrate, for example, via covalent bonding or adsorption. Alternatively, the samples may remain unfixed on the substrate.

The target areas may be selected in various ways. For example, the desired target areas may be selected from areas of the mounted samples by image observation or based on fluorescence signals or coordinate information.

In S130, an energy source is patterned so as to correspond to the target areas.

Non-limiting examples of suitable energy sources include ultrasonic waves, ultraviolet light, visible light, and electron beams. The energy source is preferably a laser light source in the ultraviolet range. The energy source may be patterned using suitable modulators, for example, light shape modulators (LSMs), spatial light modulator (SLM), and acousto-optic modulators (AOMs). For example, a light shape modulator may use a lens to enlarge the cross-sectional area of laser light and use a slit or micromirror array to pattern the laser light.

Energy is extracted from the patterned energy source and its original energy path is shape modulated in cross-sectional area so as to correspond to the shape of the target samples corresponding to the target areas. That is, the shape-modulated energy can be used for selective separation of the desired target samples.

In S140, energy is extracted from the patterned energy source, the extracted energy is applied to the target areas such that target samples corresponding to the target areas are released from the substrate, and the target samples are recovered.

In one embodiment, the patterned energy may be applied without the need to move the location of the substrate relative to the application location of the energy. For large-area patterning, a suitable element such as a lens may be used to enlarge the energy irradiation range without using an electrically-driven stage.

The energy application conditions, including the wavelength and size of the energy and the frequency and time of the energy application, may be controlled to protect the target samples from damage. For example, a single shot of the energy may be applied to separate the target samples.

In one embodiment, the energy may be applied such that it is uniformly transferred as a whole along the contours of the target areas. This uniform energy transfer allows the target samples to be released all at one time. The contours of the target areas may be closed paths surrounding the target areas. In this case, the target samples may be separated in a short time by a single shot of the energy. Particularly, the method of the present disclosure enables accurate and fast separation of large-area target areas (for example, ≥1000 μm²).

In a further embodiment, the energy may be applied to the target samples present in the target areas. In this embodiment, it is preferred to interpose a sacrificial layer between the substrate and the sample layer to protect the target samples, particularly biological materials, from damage caused by direct application of the energy. The material for the sacrificial layer is not especially limited so long as it can absorb the energy and can be easily separated from the substrate when the energy is applied. This embodiment enables the separation of cells with a very small area (e.g., ≤100 μm²) without the need to cut out the boundaries, unlike the previous embodiments.

As described in the foregoing embodiments of the present disclosure, when the energy is applied into the samples, the target samples are released all at one time along their shape, reducing the probability of damage to the target samples. This is distinguished from cut-out processes such as laser microdissection.

In a preferred embodiment, a guide beam may be irradiated onto the sample layer to guide the energy such that the locations of the target areas match the application locations of the patterned energy. Since the energy is high enough to separate the samples, the use of the guide beam enables the separation of the target samples with high reliability and precision in terms of irradiation location and shape.

In a preferred embodiment, the target areas are pre-defined before application of the patterned energy to the target areas. For example, all samples may be completely stained by a suitable staining technique such as H&E, FISH, IHC or IF to separate the target samples. Thereafter, the stained samples are directly observed and the target areas are defined by a specialist (such as a pathologist, biologist or doctor). Alternatively, the target areas may be defined by an automated approach. According to the automated approach, the target sites can be pre-defined by a machine learning procedure or a cell clustering algorithm to automatically recognize the shape and texture of cells, the size of nuclei, the size ratio between nuclei and cytoplasm, and the degree of elongation of cells.

FIG. 2 is a process flow diagram illustrating a method for separating biological materials according to one embodiment of the present disclosure. Referring to (A) of FIG. 2, laser light extracted from a light source passes through a light shape modulator, where the shape of the laser light is modulated. The shape-modulated laser is enlarged via a lens and is then applied to biological materials. More specifically, (B) of FIG. 2 shows the cross-sections in the direction perpendicular to the path of the laser light before and after patterning and are indicated by a circle and a closed path, respectively. As such, light is modulated along the shapes of the contours (i.e. closed paths) of desired target areas selected from areas of a layer of the samples mounted on the substrate and an instantaneous single shot of the modulated light enables accurate separation of desired biological material samples from the substrate.

According to the method of the present disclosure, the patterned laser is applied to only the shapes having closed paths defined by the contours of the target areas rather than all target areas. Thus, the desired biological material samples can be selectively separated without damage. Furthermore, the energy is applied such that it is uniformly transferred as a whole along the contours of the target areas. This uniform energy transfer allows the target areas (i.e. the desired samples) to be released all at one time.

FIG. 3 is a schematic diagram illustrating a method for separating biological materials according to a further embodiment of the present disclosure. Referring to FIG. 3, modulated laser light is applied to the inner portions of one or more biological materials of interest rather than along the contours of the biological materials. This direct laser application may bring about thermal damage to the biological materials, as described above. It is thus preferred to interpose a sacrificial layer between the substrate and the sample layer.

FIG. 4 is a schematic diagram for more specifically explaining the role of the sacrificial layer in the embodiment of FIG. 3.

The sacrificial layer is preferably composed of a material that is controlled to transfer energy sufficient to separate the target areas from the substrate without causing damage to the target areas when the energy is applied. The sacrificial layer absorbs energy to achieve increased separation efficiency and reduces the total amount of energy applied to the target samples to minimize damage to the target samples.

The sacrificial layer may be composed of a light-transmitting metal oxide or light-transmitting plastic material. Alternatively, the sacrificial layer may be composed of glass or silicon that has the potential to decrease transmittance or increase absorbance, resulting in an increase in energy absorption. For example, the sacrificial layer may be coated on the surface of a solid such as glass or silicon. The sacrificial layer may be provided inside a solid such as glass or silicon. However, the material for the sacrificial layer is not limited. It is preferred that the material for the sacrificial layer is free of optical distortion in order to easily determine whether the laser light is accurately applied to the locations of the target samples.

For example, the target samples are biological materials such as cells. In this case, the energy may be an infrared laser to protect the target samples from damage. At this time, it is preferred that the sacrificial layer is evaporated by the infrared laser and allows visible light to transmit therethrough to avoid disturbance when an image of the biological materials is observed. Preferably, the sacrificial layer is composed of a metal oxide. For example, the metal oxide may be indium tin oxide (ITO), indium zinc oxide (IZO), zinc oxide (ZnO), indium zinc tin oxide (IZTO), cadmium tin oxide (CTO) or indium gallium zinc oxide (IGZO) but is not limited thereto.

The energy is directly applied to the sacrificial layer. This direct energy application is preferred because the target samples can be protected from damage. For example, the energy may have a density sufficient to evaporate portions of the sacrificial layer on which the target samples are located. In this case, the applied energy can completely evaporate the corresponding portions of the sacrificial layer to allow the target samples to be released from the substrate. However, it is preferred that the sacrificial layer where the target samples are located is not completely evaporated but the upper portions of the sacrificial layer to which the energy is applied are partially evaporated and the target samples are released from the substrate while remaining mounted on the residual portions of the sacrificial layer.

The energy may be in the infrared, visible or ultraviolet wavelength range, for example, 10 to 10,000 nm. The wavelength of the energy is preferably in the range of 20 to 5,000 nm, more preferably 100 to 2,000 nm.

Particularly, in the case where the energy is applied over the entire interior of the target areas, it is preferred that the energy is a laser having a wavelength of 500 nm or above. The laser may be in the visible wavelength range of 780 nm to 1 mm, preferably 900 to 1500 nm. The laser may be an Nd:YAG laser. A pulsed laser is also useful as the energy.

Most commercially available pulsed lasers are readily applicable to the system of the present disclosure and can be appropriately used for substrates using sacrificial layers.

The pulsed laser has a pulse duration ranging from 1 as to 1 ms, preferably from 1 fs to 100 ns. The output of the pulsed laser is in the range of 10 to 1 kJ/cm$^2$ per pulse, preferably 100 to 300 J/cm$^2$ per pulse. Within these pulse duration and output ranges, the target samples can be efficiently separated from the substrate with less damage to the target samples on the substrate when the energy is applied from the pulsed laser.

Pulsed laser ablation or radiation pressure release occurs in desired areas of the substrate where the pulsed laser is applied, causing complete evaporation of the sacrificial layer or partial evaporation of the upper portion of the sacrificial layer and separation of the target samples mounted on the sacrificial layer alone or together with the sacrificial layer from the substrate. As a result, the target samples are separated in the direction opposite to the direction where the pulsed laser is applied.

The separated samples can be used for subsequent analysis. For example, the separated samples may be used for gene analysis of specific cancer cells in tissue sections. To this end, first, the whole genomes of the separated samples are amplified. Then, sequencing libraries are constructed, followed by sequencing using a next generation sequencer. This procedure enables the use of the selectively separated desired samples for gene analysis of specific cancer cells in tissue sections.

FIG. 5 compares a conventional laser microdissection process A with a laser-based separation method B according to one embodiment of the present disclosure. Referring to A of FIG. 5, a target cell is separated from a cell population on slide glass or a polymer substrate by a conventional laser microdissection process. According to this process, a laser beam spot is applied to the target cell, the sample is burnt at a width corresponding to the diameter of the spot, inevitably causing damage to the sample. That is, since the target cell is isolated by cutting, there is a high probability that the separated cell will be damaged. Due to the thickness of the laser spot, some unwanted normal cells are also separated. In conclusion, the target cell is difficult to selectively separate by the laser microdissection process.

Referring to B of FIG. 5, a target cell is separated by indirect laser catapulting. According to this process, a shape-modulated laser is indirectly irradiated onto the target cell through a substrate in a state in which a sacrificial layer is interposed between the substrate and the cell. When the laser reaches the target cell area through the sacrificial layer, the portion of the sacrificial layer exposed to the laser is evaporated. This evaporation allows the target cell to be released without damage to the target cell area. At this time, a single shot of the laser cuts out the target cell along the cell wall and separates the target cell from the cell population. Thus, the target cell does not coexist with other normal cell areas and includes no damaged area.

FIG. 6 is an actual image showing the removal of the sacrificial layer when rectangular laser beam spots whose sizes were controlled using a light modulator were irradiated onto the substrate. In FIG. 6, the left image shows the shapes of the laser beam spots whose sizes were controlled using a light modulator and the right image shows the results obtained when the laser beams were irradiated onto the sacrificial layer formed on the substrate. The bottom right corner of FIG. 6 shows a cross section taken along line A-B.

FIG. 7 shows the results of experiments for separating biological samples using different wavelengths of laser beams and different types of sacrificial layers. (a), (b), and (c) of FIG. 7 are optical microscopy images showing the results of experiments for separating target cells from a glass substrate, a polymer membrane substrate for laser micro-dissection, and a glass substrate coated with indium tin oxide using pulsed lasers, respectively. In (a), (b) and (c) of FIG. 7, the left columns show the experimental results obtained when an ultraviolet nanosecond laser (Nd:YAG laser, 355 nm, ~200 J/cm$^2$ or ~20 J/cm$^2$ per pulse) was used and the right columns show the experimental results obtained when an infrared nanosecond laser (Nd:YAG laser, 1064 nm, ~200 J/cm$^2$ per pulse) was used. The higher magnification images at the top right corners show the remaining areas after separation of the target samples. The scale bars at the bottom right corners indicate 50 μm.

Referring to FIG. 7, the use of the ultraviolet laser for the separation of target samples from biological samples caused damage to the biological samples irrespective of the type of substrates. This fact was supported by blackening around the separated samples. From this blackening, it can be inferred that the separated cells were also damaged by the laser, which is explained by much faster energy transfer by light than the cell separation speed. In contrast, the use of the infrared laser caused no changes in the glass substrate (a) and the polymer membrane substrate (b). This observation is believed to be because the light in the infrared wavelength range was insignificantly absorbed by the substrates and the samples and did not transfer energy to the substrates and the samples. In the experiment using the metal oxide, the samples were separated without damage when the infrared laser was used, unlike when the ultraviolet laser was used. This result is believed to be because the infrared laser absorbed by the metal oxide layer transferred energy without causing damage to the samples and evaporated the metal oxide to separate the samples. FIG. 8 shows microscopy images of a blood smear specimen A and a tissue section specimen B before and after separation by laser irradiation. In A and B of FIG. 8, the left and right images show the specimens before and after separation of target samples, respectively. A of FIG. 8 shows selective separation of the target cell indicated by the dashed lines. B of FIG. 8 shows the separation of desired areas from the tissue section.

FIG. 9 is a schematic diagram illustrating a method for separating biological materials according to another embodiment of the present disclosure. Referring to FIG. 9, desired biological materials are separated by entering laser light whose shapes are modulated, as already explained in FIG. 4. Other areas of non-interest are not separated. Alternatively, desired biological materials are separated by cutting along the contours of the desired areas, as already explained in FIG. 3. In this embodiment, a guide beam is used to pre-define the irradiation location and the shape of the laser.

That is, a guide beam is applied such that the application locations of the energy match the locations of the target areas. The guide beam guides the energy to pass through a light shape modulator, like the laser light. The guide beam may be irradiated before or during application of the patterned energy. Preferably, the guide beam is applied with a low energy in a short time such that the target areas are not damaged.

Referring to FIG. 9, a half mirror is located perpendicular to a light path through which the laser passes and reflects reference light to mark portions where the laser is to be irradiated. The reference light propagates along the same path as the laser. The shape of the laser light is modulated while passing through the light shape modulator. The shape and the irradiation location of the modulated laser light can be pre-defined by the guide beam. The projection location of the irradiated guide beam on the substrate may be spaced a distance from the location of the patterned energy source on the substrate. These locations can be adjusted such that the samples are accurately separated.

The target samples separated from the substrate can be transferred to a counterpart substrate or reservoir as a recovery container. The target samples transferred to the recovery container are isolated and used in other reactions. The counterpart substrate may have various shapes. For example, the counterpart substrate may have a plurality of wells for accommodating the released target samples. The reservoir may include a container where a physical or chemical reaction takes place or can be monitored. The reservoir may include a container adapted to store the target samples.

In one embodiment, one or more target samples may be collected in one place. For example, 100 or more or 1000 or more cells may be collected in one place to avoid the need for amplification.

In one embodiment, the recovery container may have a micro-sized array or micro-sized or larger wells to recover the target samples.

In one embodiment, the target samples may be recovered in the recovery container containing a barcode material (for example, DNA, RNA, protein or fluorescent material). In this embodiment, one barcode is introduced into one or more biomolecules for biochemical labeling.

In one embodiment, the sacrificial layer may be modified for chemical labeling and a barcode material may be previously applied or covalently bonded to the sacrificial layer to introduce one barcode into one or more biomolecules. The barcode material may be introduced by ligation of a suitable material such as DNA, RNA or protein or may be linked by PCR.

In the case where different barcodes are introduced into the separated samples, several samples are collected (pooling) and used all at one time for biochemical reactions and analyses. After data are sorted based on the barcodes, data from each sample are analyzed. This processing of the collected samples can save cost and labor.

FIG. 10 illustrates an apparatus for selectively separating samples from a substrate according to one embodiment of the present disclosure. Referring to FIG. 10, the apparatus 200 includes a stage 210 adapted to support a substrate mounted with samples, a stage 220 adapted to collect separated target samples, a laser light source unit 230 from which light is extracted to separate the target samples from the samples, a light shape modulator 240 adapted to pattern the laser light along the shape of target areas where the target samples are located, and a guide light source unit 250 adapted to irradiate a guide beam onto the same locations as locations on the substrate where the patterned laser light reaches.

The stage 210 is preferably movable to the locations of the target samples by moving the sample-mounted substrate in the X-, Y-, and Z-axes.

The stage 220 is preferably movable to locations where the samples separated by laser irradiation can be collected by moving a substrate (for example, a well plate) adapted to collect the separated samples in the X-, Y-, and Z-axes.

The laser light source unit 230 irradiates a laser in the ultraviolet, visible or infrared wavelength range) to separate the samples. At this time, it is preferable to control the size of the energy such that the samples are separated but are not affected. The laser may be a continuous or pulsed laser. Preferably, the pulsed laser has a pulse length at which energy sufficient to separate the samples can be applied.

It is preferred that the shapes of the passing laser light and guide beam are controlled so as to match the locations and sizes of the target samples by the light shape modulator 240. For the shape modulation, a slit may be used to block the directions of propagation of the laser light and the guide beam. The size of the light may be controlled using a digital micromirror device (DMD) to reflect only a necessary portion of the light. A lens may also be used to enlarge or reduce the shapes of the laser light and the guide beam. Preferably, when the laser light and the guide beam are simultaneously irradiated, it is preferred that the laser light and the guide beam propagation in the same direction. As a result, the laser light and the guide beam with the same shape overlap each other and the overlapping light is output.

The guide beam emitted from the guide light source unit 250 propagates through the same light path as the laser emitted from the laser light source unit 230 and allows an operator to observe the irradiation location and size of the laser in real time. For example, a half mirror may be used to allow the laser and the guide beam to propagate through the same light path. It is preferable that the energy of the applied light is controlled to a size that does not affect the target samples.

As is apparent from the foregoing, the method of the present disclosure enables very fast separation of biological materials from a substrate by a single shot of light. The apparatus of the present disclosure does not require precise movement of the stage adapted to support the sample-mounted substrate, avoiding the use of expensive devices, such as an electrically-driven stage and a light path modulator. In addition, the apparatus of the present disclosure does not generate errors caused by the movement of an electrically-driven stage, achieving high separation accuracy. Furthermore, the use of the sacrificial layer or the separation of biological materials all at one time along the contours of target areas causes no damage to the biological materials. Moreover, the guide beam can be used to predefine target areas to be irradiated with a laser, achieving very high reliability and precision of the method.

The method of the present disclosure has much higher throughput and efficiency than commercially available laser-based cell separation methods. Therefore, the method of the present disclosure will contribute to advances in related technologies, such as technologies for cancer diagnosis and biomarker discovery.

While the present disclosure has been described in detail with reference to the foregoing embodiments, those skilled in the art will appreciate that various modifications can be made thereto without departing from the technical spirit and scope of the present disclosure.

The invention claimed is:

1. An apparatus for selectively separating samples from a substrate, comprising:
   a stage adapted to support a substrate mounted with samples;
   a laser light source unit from which laser light is extracted to separate target samples from the samples;
   a light shape modulator configured to pattern the extracted laser light in accordance with a shape desired by a user; and
   a sample recovery stage on which a substrate is located to accommodate the separated target samples,
   wherein,
   the light shape modulator is one selected from the group consisting of light shape modulators (LSMs), spatial light modulators (SLM), and acousto-optic modulators (AOMs), and
   the light shape modulator is configured such that all of the target samples are being able to be released from the substrate at once by a single shot of the patterned laser light.

2. The apparatus according to claim 1, further comprising a guide light source unit adapted to irradiate a guide beam onto the same locations as locations on the substrate where the patterned laser light reaches.

3. The apparatus according to claim 1, the light shape modulator is further configured such that a target area to be separated by the single shot is larger than 1000 um$^2$.

\* \* \* \* \*